United States Patent
Olds (10) Patent No.: US 7,314,131 B2
(45) Date of Patent: Jan. 1, 2008

(54) ELEVATING CONVEYOR

(75) Inventor: Peter John Olds, Maryborough (AU)

(73) Assignee: Olds Elevator, LLC, Boxford, MA (US)

( * ) Notice: Subject to any disclaimer, the term of this patent is extended or adjusted under 35 U.S.C. 154(b) by 284 days.

(21) Appl. No.: 10/547,292

(22) PCT Filed: Jan. 27, 2004

(86) PCT No.: PCT/AU2004/000091

§ 371 (c)(1),
(2), (4) Date: Jul. 21, 2005

(87) PCT Pub. No.: WO2004/067414

PCT Pub. Date: Aug. 12, 2004

(65) Prior Publication Data

US 2006/0086592 A1  Apr. 27, 2006

(30) Foreign Application Priority Data

Jan. 29, 2003 (AU) .............................. 2003900362

(51) Int. Cl.
*B65G 33/20* (2006.01)
*B65G 65/46* (2006.01)

(52) U.S. Cl. ................. 198/671; 198/658; 198/672; 198/673

(58) Field of Classification Search ........ 198/657–660, 198/670–673, 676, 677
See application file for complete search history.

(56) References Cited

U.S. PATENT DOCUMENTS

| | | | |
|---|---|---|---|
| 3,031,064 A | 4/1962 | Kline | |
| 3,070,221 A * | 12/1962 | Bobrowski | 198/671 |
| 3,135,377 A * | 6/1964 | Miley | 198/562 |
| 3,279,692 A | 10/1966 | Kerkvliet | |
| 3,349,894 A | 10/1967 | Allen | |
| 4,077,527 A | 3/1978 | Fryer et al. | |
| 4,167,825 A * | 9/1979 | Gee et al. | 37/420 |
| 4,194,615 A * | 3/1980 | Tell et al. | 198/524 |
| 4,467,910 A | 8/1984 | Siwersson et al. | |
| 4,492,302 A * | 1/1985 | Svens | 198/671 |
| 4,535,915 A * | 8/1985 | West | 222/56 |
| 4,575,959 A * | 3/1986 | Gee | 37/420 |
| 4,603,774 A * | 8/1986 | Siwersson et al. | 198/518 |

(Continued)

FOREIGN PATENT DOCUMENTS

AU  A 24574/77  11/1978

(Continued)

OTHER PUBLICATIONS

PCT Search Report and Written Opinion of the ISA for PCT/AU2004/000091 dated Apr. 6, 2004 (8 sheets).

(Continued)

*Primary Examiner*—Douglas A Hess
(74) *Attorney, Agent, or Firm*—Daly, Crowley, Mofford & Durkee, LLP (57) ABSTRACT

An elevating conveyor for flowable material comprises an inlet (14) and an outlet (20) at opposite ends of a tubular barrel (1) surrounding a helical elevating member (2). Elevating member (2) is restrained against rotation about a longitudinal axis and tubular barrel (1) is co-axially rotated about elevating member (2) by a drive mechanism (16).

34 Claims, 6 Drawing Sheets

U.S. PATENT DOCUMENTS

| | | | | |
|---|---|---|---|---|
| 4,705,432 A | * | 11/1987 | Harbolt et al. | 406/60 |
| 4,763,772 A | * | 8/1988 | Gradoboev et al. | 198/398 |
| 4,793,467 A | * | 12/1988 | Johansson et al. | 198/518 |
| 4,796,747 A | | 1/1989 | Kajiwara | |
| 5,368,153 A | * | 11/1994 | Bruke | 198/608 |
| 5,370,236 A | * | 12/1994 | Wallace et al. | 209/173 |
| 5,573,660 A | * | 11/1996 | Eicker et al. | 210/162 |
| 5,626,218 A | * | 5/1997 | Kamiwaki | 198/518 |
| 5,845,762 A | * | 12/1998 | Stark | 198/550.1 |
| 6,010,280 A | * | 1/2000 | Svensson | 406/56 |
| 6,932,210 B2 | * | 8/2005 | Kramer | 198/495 |

FOREIGN PATENT DOCUMENTS

| | | |
|---|---|---|
| DE | 3708208 A1 | 10/1987 |
| FR | 1034480 | 3/1951 |
| WO | WO 95/26310 | 10/1995 |
| WO | WO 2004/067414 | 8/2004 |

OTHER PUBLICATIONS

PCT Written Opinion of the International Preliminary Examining Authority for PCT/AU2004/000091 dated Apr. Jan. 19, 2005 (4 sheets).

PCT International Preliminary Report on Patentability for PCT/AU2004/000091 dated Apr. Jun. 8, 2005 (7 sheets).

Bates; "Above and Beyond;" Solids & Bulk Handling; Feb. 2005; pp. 1 and 10-12.

* cited by examiner

ELEVATING CONVEYOR

CROSS REFERENCE TO RELATED APPLICATIONS

This application is a National Stage application under 35 U.S.C. §371 of and claims the benefit of International Application PCT/AU2004/000091, filed on Jan. 27, 2004, which application claims priority to Australian Patent Application No. 2003900362, filed on Jan. 29, 2003, which applications are incorporated by reference in their entirety.

FIELD OF THE INVENTION

This invention is concerned with methods and apparatus for the conveyance or elevation of flowable materials from a base position to an elevated position.

The invention is concerned particularly although not exclusively with upright helical conveyor mechanisms wherein a helical elevator member functions as a stator and, a tubular housing surrounding the helical elevator mechanism functions as a rotor.

BACKGROUND OF THE INVENTION

There are many forms of conveyor mechanisms for transporting materials from one position to another and the choice of conveyor mechanism is affected by many factors including the physical nature of material to be conveyed, the horizontal and/or vertical distances to be traversed, capital cost, on-going maintenance costs and the like.

While there is a wide range of conveyors available for horizontal or slightly inclined transportation paths, there are relatively few forms of conveyor available for elevation of materials along an upright transportation path falling within the range of from, say, 45° to a horizontal datum to 90° or perpendicular to a horizontal datum. Even then, the suitability of a conveyor or elevating system is often dictated by the nature of the materials to be handled. Where floor space requirements are not critical, tubular screw augers may be used to elevate flowable particulate materials such as cereal grains through an angle of from about 30 to 40 degrees and a multiplicity of screw augers located on vertically spaced landings is required to elevate the grain over any significant height. Where floor space is more critical, bucket elevators are often employed. For very fine or low mass particulate materials, pneumatic conveyors may be used to good effect.

Several major shortcomings are apparent in conventional materials elevators utilized in the field of foodstuffs handling. Many foodstuffs such as potato crisps are highly fragile while others such as soy beans, freeze dried coffee granules are easily damaged even with the gentlest handling. Pneumatic conveying of aggressively abrasive particulate material such as foundry sands gives rise to very high maintenance costs due to wear, particularly in the region of conveyor ducts, where a change of direction is required.

Generally speaking, the difficulties encountered in the elevation of flowable materials has led to custom designed conveyor/elevator systems or otherwise an unsatisfactory compromise with apparatus not particularly suited to the materials being transported or the environment in which the elevating apparatus is required to operate.

Conventional screw augers, even when inclined at an angle of less than 45° to a horizontal datum are known to damage many particulate materials due to pressurization in the auger barrel with the accumulation of finely crushed detritus making it difficult to maintain cleanliness. Vertical or near vertical operation of a conventional screw auger appears to be unknown because of extreme pressure build up within the auger barrel due to friction and this in turn leads to excessive power requirements. Depending upon the clearance between the screw flight and the inner wall of the auger barrel, backflow will occur with larger clearances while crushing of the particulate material with excessive screw and barrel wear will occur with small clearances.

For any long screw augers, it is necessary to support the rotatable screw with "hanger" bearings at spaced intervals within the auger tube. A hanger bearing is located centrally of the auger tube by radially extending brackets and the bearings each support the auger shaft in a region of discontinuity in the auger flight necessitating a "back pressure" to feed material across the discontinuity gap to the next auger flight.

It is known to operate a screw auger type conveyor wherein the barrel is rotatable, at least partially relative to the auger screw.

U.S. Pat. No. 3,349,894 describes an inclined screw auger elevator for frangible materials such as potato or corn chips. The screw comprises a cupped helical flight with upturned outer edges and the tubular conveyor barrel rotates with the screw. Very careful attention must be paid to feed rates and screw rotational speed to avoid crushing of the frangible particulate material in use.

U.S. Pat. No. 3,279,592 describes a horizontal screw auger conveyor wherein the auger screw and the tubular barrel rotate together to avoid wear from relative rotation therebetween. A plurality of apertures along the barrel permit distribution of the particulate material to a multiplicity of delivery stations along the path of the conveyor.

U.S. Pat. No. 3,031,064 describes a horizontal screw auger conveyor having a split barrel wherein each barrel portion is selectively rotatable coaxially with the screw auger and each barrel is adapted to distribute particulate material at spaced delivery stations via hinged closures manually movable between a closed position and an open position under the influence of gravity by rotating a respective tube portion through about 180°.

Australian Patent Application 24574/77 discloses a horizontal screw auger having a helical slot formed in the tubular barrel. The tubular barrel is able to be rotationally oscillated in the same direction of rotation as the screw or counter thereto to selectively deposit material in an elongate delivery station beneath the auger barrel.

International Publication WO 95/26310 describes a feeder tube conveyor in the form of a horizontal screw auger with a plurality of inlet openings spaced helically about the portion of the tubular screw barrel located within a hopper of difficult to feed fibrous material. Associated with each inlet opening is an activator to disturb the fibrous material in the hopper above the screw barrel to prevent bridging of the material in the hopper. The auger barrel is rotatable with the screw but its direction of rotation may be reversed to clear blockages in the inlet openings.

German Patent Application DE 3 708 208 is concerned with a filling apparatus for thick pasty materials wherein a feed hopper and a tubular barrel are caused to rotate independently relative to a vertical stationary screw auger. The upper flight of the screw auger is shaped as a sweep to urge material into the mouth of the barrel and to flow downwardly therethrough.

U.S. Pat. No. 4,077,527 discloses an apparatus for horizontally transporting and dispensing a very fine particulate material wherein a conduit rotates about a stationary coil spring located within the conduit. The spring is fastened externally of a discharge end of the conduit and the inlet comprises a plurality of apertures in the conduit. The inlet communicates directly with a pressure fed hopper to receive a powdered feed of less than 50 micron particle size. The inlet end of the spring is allowed to float to permit axial extension of the spring under load.

It is an aim of the present invention to overcome or ameliorate at least some of the disadvantages associated with prior art elevating conveyors for flowable materials. As used herein, the expression "flowable materials" includes particulate materials, slurries, viscous liquids and the like but is not limited thereto.

SUMMARY OF THE INVENTION

Accordingly to one aspect of the invention there is provided an elongate elevating conveyor for flowable materials, said conveyor comprising:— an inlet and an outlet;

a helical elevating member supported, in use, with a longitudinal axis in a substantially upright position, said elevating member being secured at at least one end to a support structure, said elevating member being secured against rotation about said longitudinal axis;

a tubular barrel surrounding said elevating member and rotatable coaxially therewith said tubular barrel being rotatably journalled in bearing members spaced intermediate opposite ends of said barrel, said bearing members being secured to said support structure; and, a drive mechanism to rotatably drive said tubular barrel, said conveyor characterized in that a predefined working clearance between a cylindrical volume occupied by said helical elevating member and an inner surface of said tubular barrel is such that, in use, a stable layer of flowable material is formed against said inner surface of said tubular barrel, said stable layer urging a mass of flowable material within said barrel along an upward helical path by frictional engagement between said stable layer and said mass of flowable material.

Suitably, the inlet may be located adjacent a lower end of said tubular barrel.

Alternatively, the inlet may be located adjacent a top end of a hollow tubular support shaft for said elevating member.

If required, a conveyor feed mechanism may be associated with said inlet to feed flowable material to said elevating conveyor at a predetermined rate.

Preferably, said conveyor feed mechanism comprises at least one sweep member mounted on said tubular barrel for rotation therewith, said sweep member projecting outwardly from an outer wall surface of said tubular barrel.

If required, one or more apertures may be formed in said tubular barrel adjacent a respective at least one sweep member.

Said at least one sweep member may be adjustable to selectively increase or decrease a swept volume as said tubular barrel rotates.

The sweep member may be adjustable in length.

Alternatively, the sweep member may be adjustable in width.

Preferably, the sweep member is angularly adjustable relative to said outer wall surface of said tubular barrel.

If required, at least portion of said sweep member may be resiliently flexible.

Suitably, a feed hopper surrounds an inlet located adjacent a lower end of said tubular barrel.

The tubular barrel may be rotatably journalled in spaced bearing members secured to a support structure.

Preferably, said support structure comprises a frame.

Suitably, said elevating member is secured at opposite ends of said frame member.

If required, said elevating member may be adjustably mounted in same frame to permit, in use, tension to be applied to said elevating member in the direction of the longitudinal axis of said elevating member.

The helical elevating member may comprise a helically wound rod-like member with a central hollow cylindrical space extending over a longitudinal axis of said hellically wound member.

Alternatively, the helical elevating member may comprise a hellically wound ribbon blade.

The helical elevating member may comprise a central shaft.

If required, the central shaft may comprise a hollow shaft.

Suitably, said hollow shaft is adapted, in use, to permit circulation of a working fluid therethrough to permit said elevating conveyor to function as a heat exchanger for fluid materials being conveyed therein.

Preferably, a working clearance between a cylindrical volume occupied by said helical elevating member and an inner surface of said tubular barrel is greater than a mean particle diameter of packable flowable particulate material.

Alternatively, a working clearance between a cylindrical volume occupied by said helical elevating member and an inner surface of said tubular barrel is less than a mean particle diameter of non-packable material.

The drive mechanism may comprise a drive motor mounted on said support structure, said drive motor being drivably engageable with a drive transmission mechanism coupled to said tubular barrel.

Preferably, a collector is positioned about said outlet to collect flowable material issuing from said outlet.

According to another aspect of the invention there is provided a method for elevation of a flowable material, said method comprising the steps of:— feeding a flowable material to an inlet of an elevating conveyor comprising a stationary helical elevating member surrounded by a rotatable tubular barrel with a predefined working clearance between said helical elevating member and an inner surface of said barrel; and, rotating said barrel at a speed sufficient to urge said flowable material towards said inner wall of said barrel to form a stable layer of flowable material thereon, whereby a mass of flowable material within said tubular barrel is urged upwardly along a helical path by frictional engagement between said mass of flowable material and said stable layer.

If required, said tubular barrel may be rotated at a speed sufficient to form a static layer of flowable material in a clearance space between a cylindrical volume occupied by said helical elevating member and an inner surface of said tubular barrel.

Preferably, fluid material is elevated in said conveyor as a hollow cylindrical mass.

If required, flowable material is fed to said inlet at a rate to substantially occupy a free volume within a cylindrical volume occupied by said elevating member during rotation of said tubular barrel.

Alternatively, flowable material is fed to said inlet at a rate to occupy less than a free volume within a cylindrical volume occupied by said elevating member during rotation of said tubular member.

Suitably, a feed rate of said flowable material to said inlet is selectively varied by changing the configuration of a sweep member mounted on said tubular barrel.

The configuration of said sweep member may be changed by altering the dimensions of said sweep member.

Alternatively, the configuration of said sweep member may be changed by altering an angular disposition of said sweep member relative to an outer surface of said tubular barrel.

If required, the feed rate of said flowable material to said inlet is selectively variable by altering a rotational speed of said tubular barrel.

The flowable material may be introduced into an inlet at an upper end of a hollow central shaft of said elevating member to flow countercurrent to a mass of flowable material being elevated within said conveyor.

Suitably, a flowable material containing a liquid and particulate solids mixture may be separated by subjecting the mixture to a centripetal force as the tubular barrel rotates and collecting liquid from a region adjacent a longitudinal axis of said elevating member and collecting condensed solids from a region adjacent an outer edge of the helical elevating member.

BRIEF DESCRIPTION OF THE DRAWINGS

In order that the invention may be more fully understood and put into practical effect, reference will now be made to preferred embodiments illustrated in the accompanying drawings in which:—

For the sake of clarity, like reference numerals are employed for like features in the drawings where appropriate.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

DETAILED DESCRIPTION OF THE INVENTION

Figure 1:
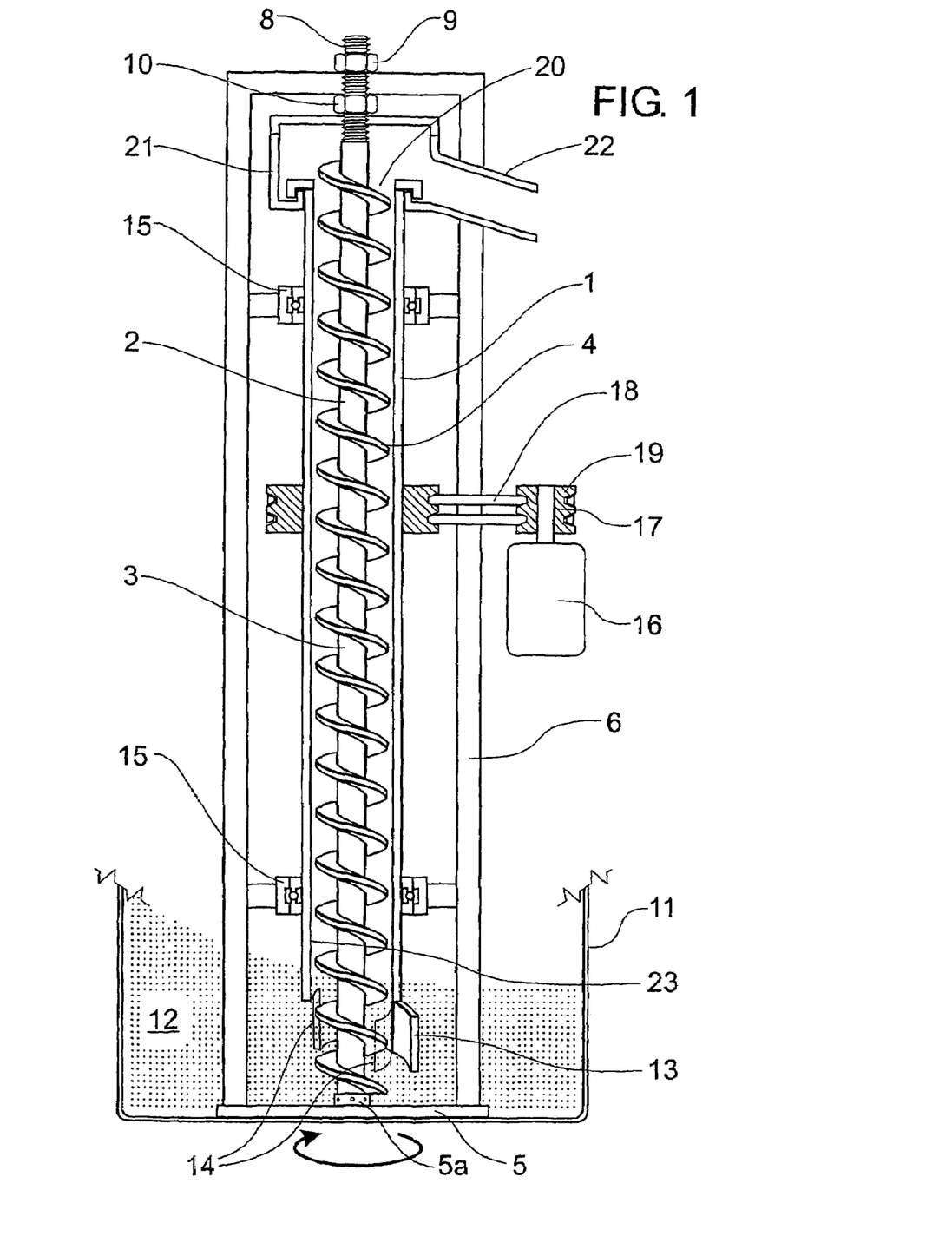
FIG. 1 shows schematically a cross-sectional side elevation of an elevating conveyor according to the invention.

In FIG. 1, the elevating conveyor comprises a tubular barrel 1 surrounding a helical elevating member 2 comprising a central shaft 3 with a helical ribbon blade flight 4 extending about the circumference of shaft 3. Shaft 3 is fixedly mounted via bracket 5a to a base 5 of a support structure in the form of a frame 6. Shaft 3 is also fixedly mounted to a head member 7 of frame 6 via a threaded shaft 8 and is tensionable by means of threaded nut 9. Another threaded nut 10 functions as a lock nut when the shaft 3 has been tensioned to a required value.

The base of frame 6 is located in a hopper 11 containing a packable particulate material 12 such as sharp foundry casting sand. A sweep member 13 projects outwardly from an outer surface of tubular barrel 1 adjacent an opening 14 (shown in phantom) therein and extends forwardly in a direction of rotation of barrel 1 at an angular disposition to the outer surface of barrel 1.

Barrel 1 is rotatably journalled in bearings 15 mounted on the support structure frame 6 and is rotatably driven by an electric drive motor 16 coupled via a drive transmission comprising pulleys 17, 18 and drive belts 19. Suitably, drive motor 16 is also supported by frame 6.

Located at the upper outlet end 20 of tubular barrel 1 is a collector 21 to collect particulate material as it emerges from outlet end 20. A chute 22 is connected to collector 21 to direct collected material to a storage hopper or the like (not shown).

In use, with helical elevating member 2 mounted as a stationary member with tubular barrel 1 rotating thereabout, sand in hopper 11 is swept into the space between shaft 3 and the inner wall 23 of tubular barrel 1 and, under the influence of centripetal force, is urged outwardly against the inner wall of tubular barrel 1.

Initially the mass of sand resting against the inner wall 23 rotates with the rotating barrel 1 until it engages on upper surface of an upwardly tapering helical flight 4. Continued rotation of barrel 1 urges a mass of sand to follow an upright path guided by flight 4 as a result of frictional engagement between the mass of sand and a thin layer of sand urged against the inner wall 23, the thickness of the thin layer corresponding to a clearance between the outer edge of flight 4 and inner wall 23.

At the feed end of the barrel 1, sweep 13 continues to introduce sand into the space between shaft 3 and inner wall 23 such that sand progresses upwardly through barrel 1 until it emerges at the outlet 20 and is thrown radially into collector 21 by flight 4 as the barrel 1 rotates.

Whilst not wishing to be bound by any particular hypothesis, the distinction between an elevating conveyor according to the present invention and a vertically oriented conventional screw auger with a stationary barrel and rotating screw is considered to arise from a substantially reduced level of friction between relatively moving components in the present invention.

In a conventional screw auger, reliance is made upon keeping the angle of inclination of the barrel below about 45° to ensure that the quantity of flowable particulate material between successive auger flights does not fill the tube diametrically. It is known that when a conventional screw auger is oriented vertically particulate material tends to move as a rotating cylinder. Where the screw clearance is smaller than the mean particle diameter, compaction of the particulate material occurs with a resultant increase in frictional load on the auger screw, increased power requirement, increased wear in both the screw and barrel and compression damage to frangible non-packing particulate materials such as cereal grains and the like. With packing particulate materials such as foundry sands, a vertically oriented screw auger usually will jam. Where there is a greater screw clearance, backflow will occur with resultant efficiency losses and damage to frangible particulate materials.

The present invention on the other hand exhibits differing phenomena depending mainly upon the nature of particulate materials to be conveyed along an upright path.

With a packing particulate material such as foundry sand, it is noted that where the flight clearance is greater than the mean particle size, a stable layer of sand is formed against the inner barrel wall due to centripetal force. As the barrel rotates, this layer of sand provides a limited frictional engagement with a cylindrical or hollow cylindrical mass of sand which readily shears at the edge of the helical flight so that as the effective column of sand moves upwardly in a helical path, the only compacting force which is applied to it is the relatively small centripetal force. Depending upon the nature of the particulate material being fed, the feed rate of the material and the rotational rate of the barrel, it is possible that the boundary between the layer rotating with the barrel and the mass of material moving upwardly could be quite sharply defined with a large difference in relative rotational speeds or alternatively the boundary could be less well defined with a region of material having a rotational velocity gradient from a relatively slow radially inner region to a greater rotational velocity in a radially outer region.

For larger packing particles having a much greater mean diameter or for non-packing particles such as substantially spherical objects, a flight clearance less than the mean particle size may be preferred.

In the elevation of relatively fine particulate matter such as foundry sand, it is noted that regardless of the speed of rotation of the tubular barrel there is no tendency for the helical elevator member to "whip" as does a rotating auger in a conventional screw auger. This is considered to arise due to a self-centreing action due to the build up of a layer of sand on the inner wall of the tube. As a consequence, wear which might otherwise be caused by engagement between the helical elevating member and the rotating tube is substantially eliminated. This also permits very tall elevating conveyors to be constructed.

Figure 2:
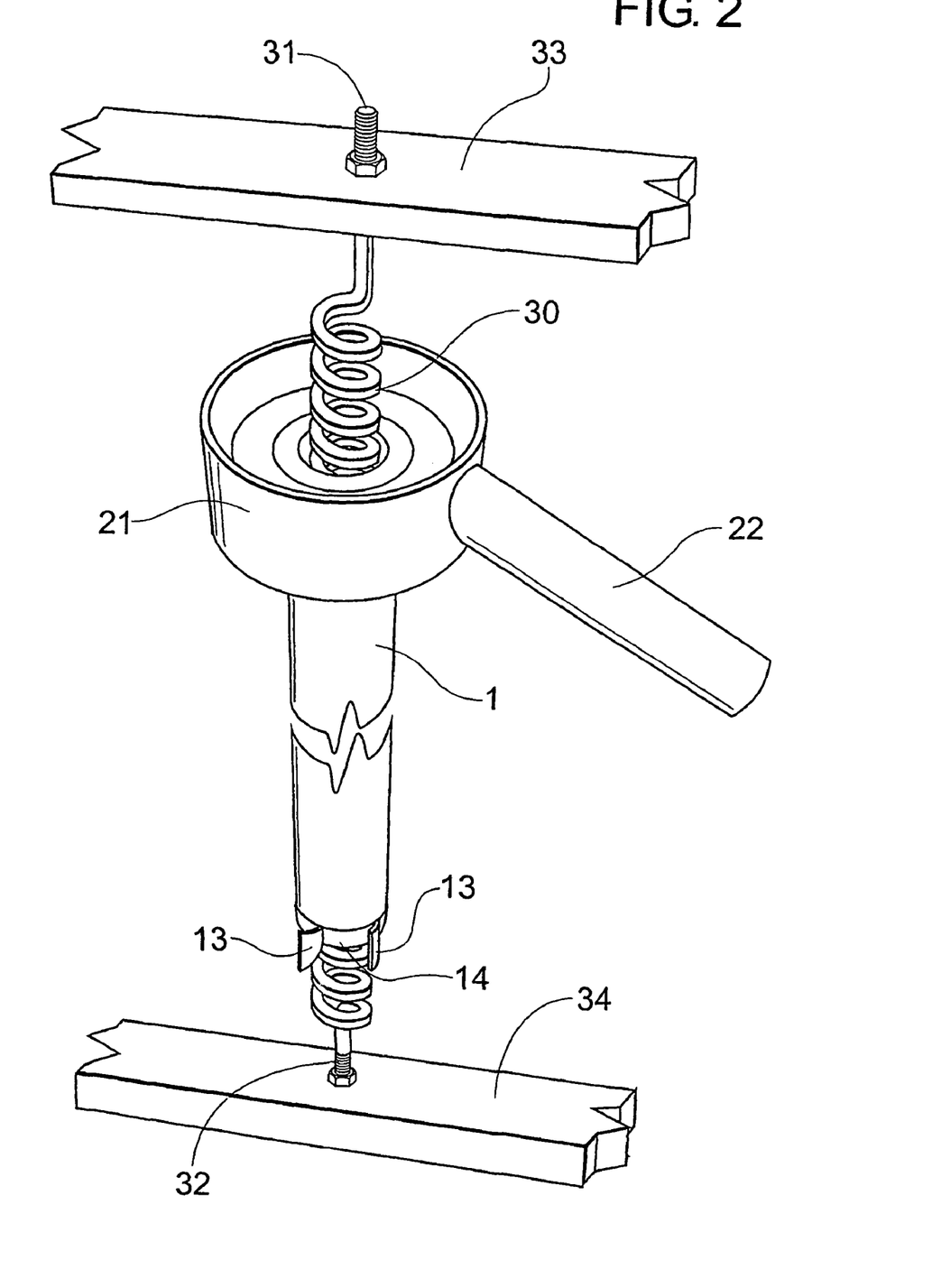
FIG. 2 shows schematically an alternative configuration of the invention.

FIG. 2 shows an alternative embodiment of the invention wherein the helical elevating member comprises a helically wound coil 30 of rectangular steel bar which may be tensioned by screw-threaded shafts 31, 32 secured in upper and lower frame mounts 33, 34 respectively. For the sake of clarity the support frame structure and barrel drive mechanisms have been omitted. It readily will be apparent to a person skilled in the art that the frame member 6 as shown in FIG. 1 is not essential as all of the components of the elevating conveyors may be supported, for example, on a structural wall or the like.

Figure 3:
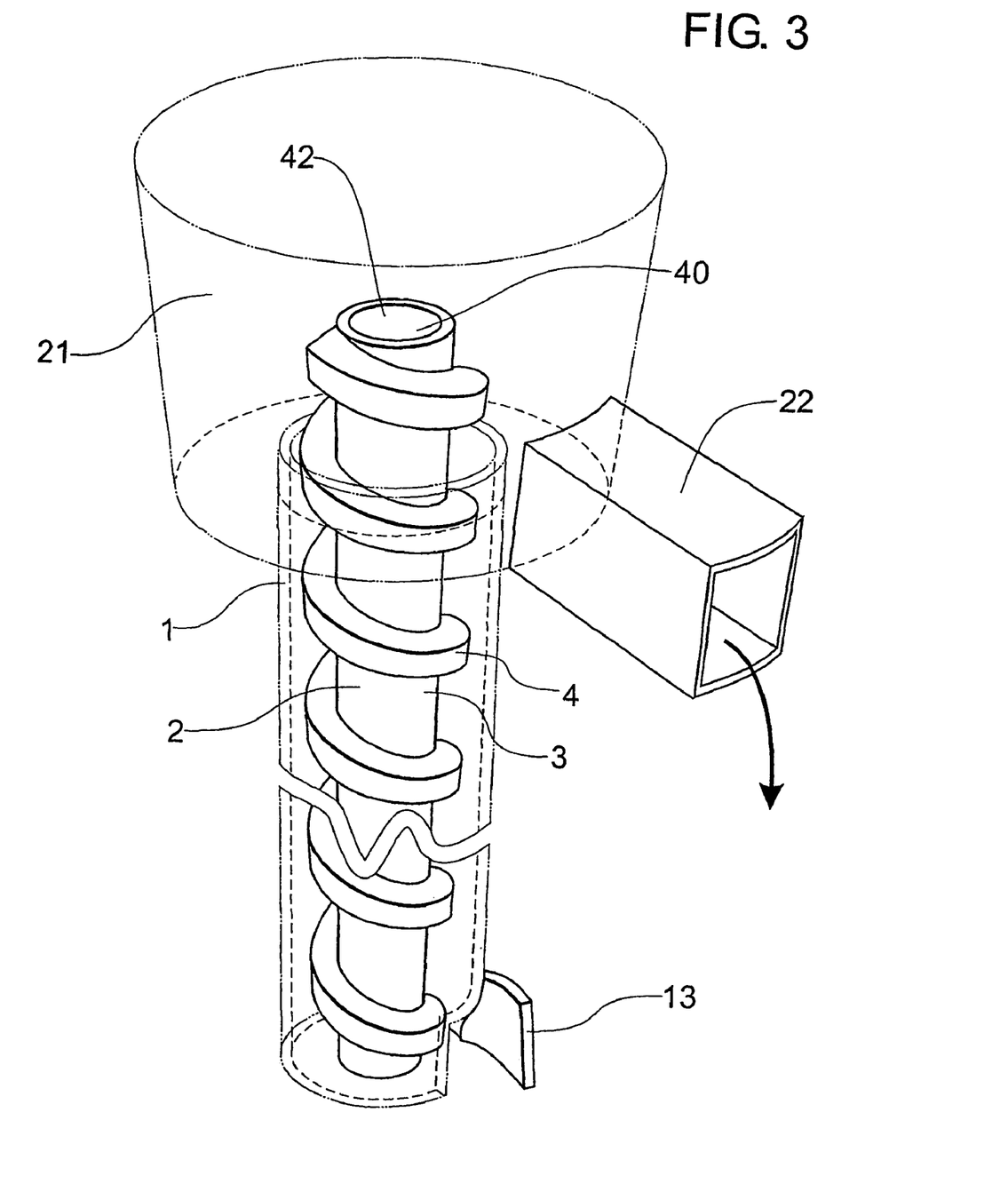
FIG. 3 shows yet another embodiment of the invention.

FIG. 3 shows schematically an alternative embodiment of the invention wherein the central shaft 3 of the helical elevating member has a hollow bore 40 extending therethrough.

In this embodiment the apparatus may be employed to form a slurry or paste from dry particulate materials and a liquid. For example, a dry mix of sand, cement and aggregate may be contained in a lower feed hopper (not shown). As tubular barrel 1 rotates, water is metered into the open mouth 42 of tubular shaft 3 whereupon it emerges in the base of the base of the hopper (not shown) and mixes with the dry ingredients as they are conveyed upwardly under the influence of rotating tube 1. Such an embodiment may have application in the preparation of food products requiring gentle mixing without compression.

Figure 4:
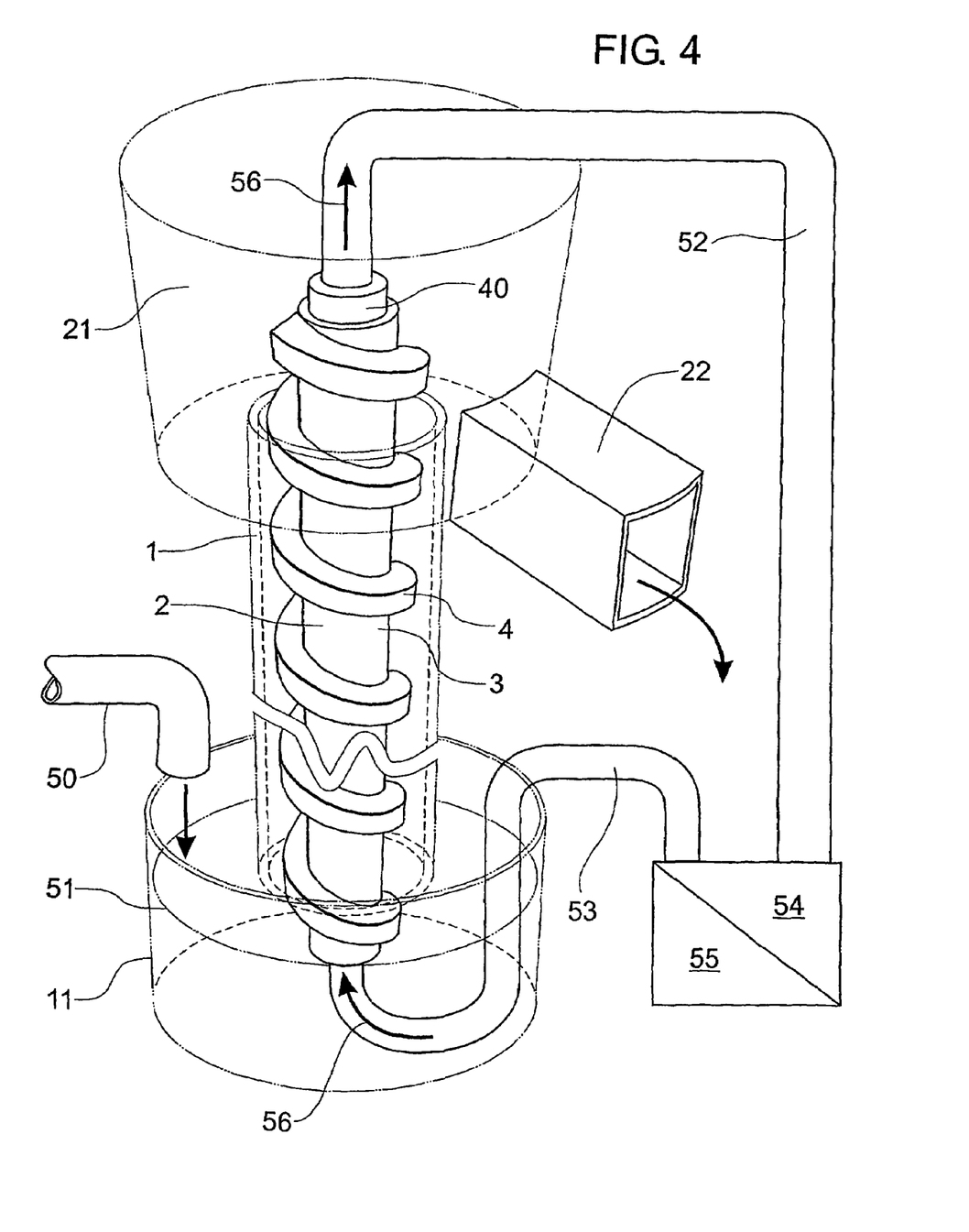
FIG. 4 shows an adaptation of one embodiment of the invention.

FIG. 4 shows a modification to the apparatus of FIG. 3 wherein the elevator member 2 is adapted to function as a heat exchanger.

In order to convey some viscous liquids such as molasses, it can be advantageous to elevate the temperature of the molasses even by 5° to 10° C. to reduce its viscosity. As shown, a viscous liquid such as molasses is supplied to hopper 11 via conduit 50 and a level 51 of liquid is maintained by any suitable flow metering means (not shown) wherein the level 51 is maintained above the lower end of tubular barrel 1. In the configuration shown, a sweep is not required as in the configurations of FIGS. 1 to 3.

Molasses flows into the region between the shaft 3 and the inner wall of barrel 1 and due to its viscosity, a frictional drag is applied by the inner wall of barrel 1 as it rotates thereby urging the molasses to follow a helical elevating path. To assist in maintaining flow, the inner bore 40 of tubular shaft 3 is coupled via conduits 52, 53 to a heater or heat exchange device 54 and a circulating pump 55 to circulate a heated working fluid through elevating member 2. As shown by arrows 56, the direction of circulation of the working fluid is concurrent although, if required, a countercurrent flow may readily be obtained. As the heated working fluid circulates through elevating member 2 it functions as a heat exchanger as the molasses or other viscous liquid ascends the helical conveyor path to reduce the viscosity of the liquid to a desired degree. When the reduced viscosity liquid emerges from the top of tubular barrel 1, it is collected by collector 21 and directed to a storage tank or the like (not shown) by outlet chute 22.

It readily will be apparent to a person skilled in the art that the elevator conveyor of FIG. 4 may be adapted for heat treatment or cooking of foodstuffs whilst elevating the foodstuff materials to a predetermined height.

Figure 5:
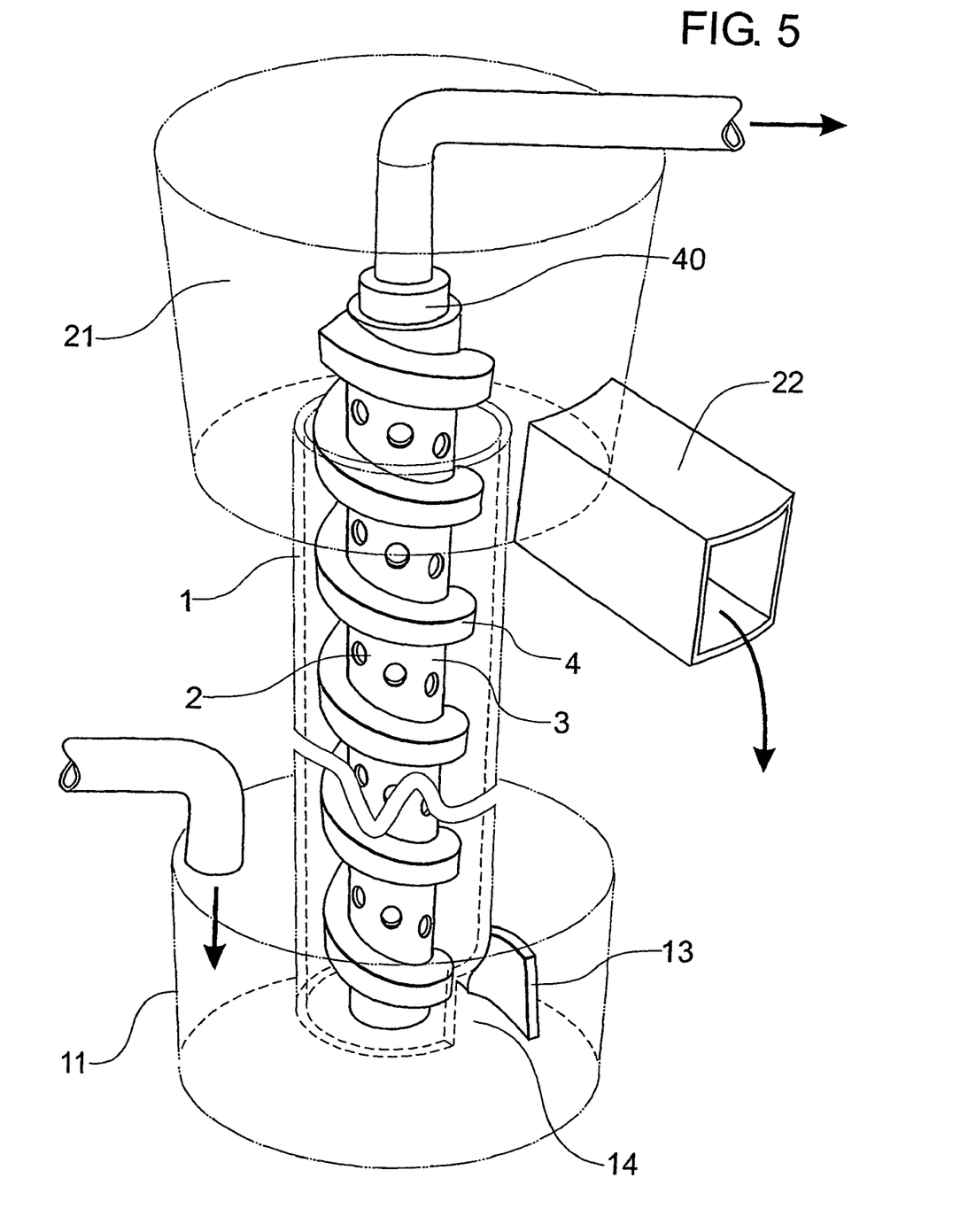
FIG. 5 shows a further adaptation of an embodiment of the invention.

FIG. 5 shows yet another adaptation of the invention for separation of solids from liquids or for dewatering of slurries.

In FIG. 5, a slurry is delivered to feed hopper 11 via a conduit 50 and a separate liquid take-off conduit 60 communicates with a hollow bore 40 of tubular shaft 3 which has a plurality of apertures 61 in the wall thereof communicating with the hollow bore 40.

As tubular barrel 1 rotates, the slurry is swept into the feed inlet region 14 of the elevating conveyor 2 by sweep 13 and under the influence of centripetal force, the particulate solids suspended in the slurry migrate outwardly towards the inner wall of barrel 1 as the slurry is elevated about a helical pathway. Supernatant liquid, substantially free of solids, is drawn off via conduit 60 while the dewatered solids material is collected in collector 21 and directed to a storage hopper or the like (not shown).

In both of the embodiments of FIGS. 4 and 5, it will be noted that as elevator member 2 remains stationary, rotary gland joints are not required for fluid communication with the central bore of shaft 3.

Figure 6:
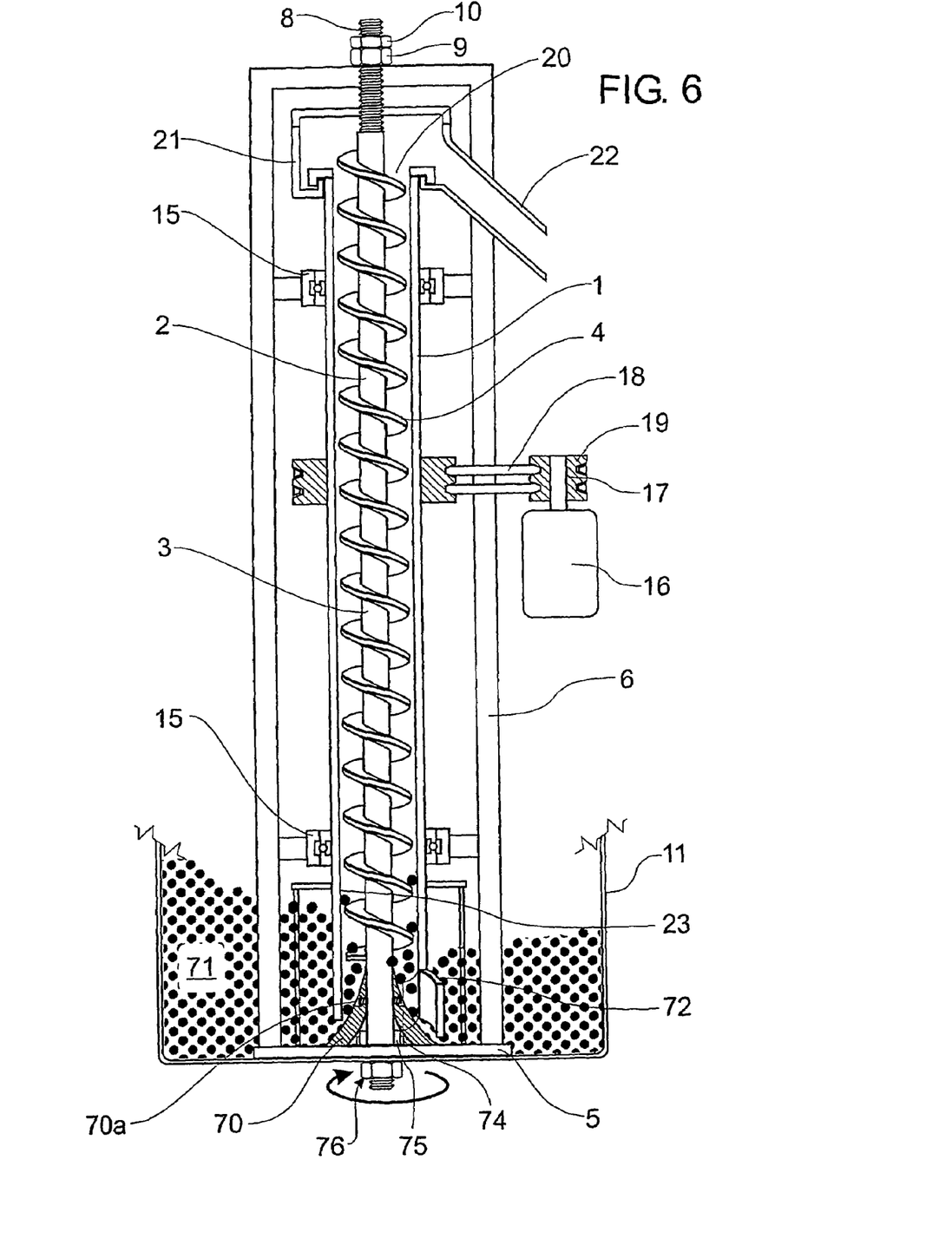
FIG. 6 shows a still further embodiment of the invention.

FIG. 6 shows yet another modification of the apparatus shown in FIG. 1.

As shown in FIG. 6, the helical elevating member 2 having a helical ribbon blade flight 4 terminates at its lower end at a position just above the sweep 13 and feed inlet region 14 adjacent thereto. A feed guide 70 in the form of a hollow frusted cone is secured to the lower end of shaft 3 by grub screws 70a and also to base 5 whereby, in use, larger diameter articles such as macadamia nuts 71 are swept upwardly over the surface of feed guide 70 into the region of the elevator flight 4 to avoid crushing of the macadamia nuts between the sweep 13 and the flight 4 which might otherwise occur with the configuration of FIG. 1 as the barrel 1 rotates. Sweep 13 may include a flexible rubber or polymeric tip 72 to avoid damage to the nuts in hopper 11 as barrel 1 rotates. Alternatively, the sweep 13 may be comprised entirely of a flexible or resiliently flexible polymeric material.

Also mounted on barrel 1 are agitator fingers 73 supported on brackets 74. Agitator fingers 73 prevent clumping or bridging of feed material near the feed inlet region 14.

Mounted on base 5 are spaced parallel projections 74 which engage flats 75 secured on shaft 3 to prevent rotation of shaft 3 due to torsional forces applied thereto by flowable material while barrel 1 rotates. A threaded nut 76 secures the lower end of shaft 3 in base 5.

The following examples illustrate the wide range of flowable materials which may be elevated with an elevating conveyor according to the invention.

EXAMPLE 1

In this example, an elevating conveyor having the general configuration of that shown in FIG. 1 was employed. The barrel was 5 metres tall and comprised a 100 mm o.d. stainless steel tube with a 1.6 mm wall thickness. The barrel was driven by a 2 kW variable speed electric motor via a 4:1 multiple V-belt drive transmission.

The helical elevating member comprised an 82 mm diameter ribbon blade helix with a 70 mm pitch supported on a 22 mm centre core.

With a feedstock of wheat and an initial barrel rotation speed of 10 r.p.m., wheat emerged from the outlet chute after the barrel filled. The rotational speed was increased stepwise up to a maximum of 320 r.p.m. at which a delivery rate of slightly in excess of 6 tonnes per hour was measured. It was noted the delivery rate of the wheat from the slowest to fastest rotational speeds was approximately proportional to rotational speeds.

In a second part of this test, the elevating conveyor was inclined at 45° substantially identical delivery rates were achieved for wheat grains over the same rotational rate spectrum of from 10 r.p.m. to 320 r.p.m.

Interestingly, without adjusting the tension in the support core for the helical flight, it was noted that when the barrel initially began rotation without any wheat contained therein, the helical flight was heard to be scraping on the inside wall of the barrel. Once the barrel began to fill with wheat, the scraping noise rapidly diminished as the barrel filled with wheat thereby supporting the hypothesis that under normal operating conditions, the helical flight was subjected to a self-centreing action.

EXAMPLE 2

The elevating conveyor described in EXAMPLE 1 was then used in a vertical orientation with dry foundry sand as a feedstock.

Once again, it was found that the delivery rate of sand increased more or less proportionately to rotational speed from an initial rate of 10 r.p.m. to what appeared to be an optimal speed of 320 r.p.m. at which the delivery rate was determined to be 6 tonnes of sand per hour.

By monitoring the current load for the 2 kW drive motor another interesting phenomenon was identified. From an initial rotational speed of 10 r.p.m. to about 100-120 r.p.m., current load increased approximately proportionately to rotational speed from about 6-7 amps up to about 13 amps. As rotational speed was increased up to about 200 r.p.m., the current load remained substantially unchanged at about 13 amps, but as rotational speed was increased gradually from about 200 r.p.m. to 320 r.p.m., the current load appeared to decrease proportionately to rotational speed increase from about 13 amps back to about 6-7 amps at 320 r.p.m.

It is believed that the phenomenon observed was due to the fact that at slow speeds, the entire internal volume of the barrel is filled with flowable material. As rotational speed of the barrel is increased, it is believed that a boundary layer is formed on the inside surface of the barrel under the influence of centripetal force whereby there is no longer a substantial frictional force exerted between the column of flowable material in the barrel and the inside wall surface of the barrel. It is considered that there exists a region between the rotating boundary layer of flowable material and the inner "core" material where the material flows over itself.

It is also considered that, depending upon the nature of the flowable material, optimum delivery rates with minimized power requirements are achieved when the flowable material does not completely fill the interior volume of the barrel. The rate of feed at optimised barrel rotation speeds may be adjusted by adjusting the "bite" of the sweep members adjacent the inlet ports of the barrel or by changing the number of sweep member/inlet port combinations.

Utilizing a prototype elevating conveyor of the type shown in FIG. 2 of the accompanying drawings, it was noted that at an optimum delivery rate for wheat grains, it was possible to insert a timber rod down the hollow central region of the helical flight without sensing the presence of granular material. At lower delivery rates, the presence of granular material in the hollow central region was clearly felt.

EXAMPLE 3

The apparatus of EXAMPLE 1 was modified by replacing the 82 mm diameter by 70 mm pitch ribbon blade helical elevating member with a 76 mm diameter by 70 mm pitch ribbon blade helical elevating member supported on a 22 mm central core.

In this test, the feedstock was dried soybeans having an average particle size in the range of from 6 to 8 mm. Optimum delivery rate of 4.5 tonnes per hour was achieved at a rotational speed of 320 r.p.m.

Even although soybeans are notoriously fragile and easily damaged in fairly gentle conveyors such as bucket conveyors, no damage was noted after soybeans were cycled continuously through the elevating conveyor for over two hours.

EXAMPLE 4

The apparatus of FIG. 6 was employed to convey non-shelled macadamia nuts, typically having a diameter in the range of from 19 mm to 29 mm.

The barrel comprised a 100 mm o.d. stainless steel tube with a 1.6 mm wall thickness and a helical ribbon blade flight of 82 mm in diameter with a pitch of 70 mm supported on a 22 mm central core was located within the barrel. Unlike the apparatus shown in FIG. 1, the lower end of the helical ribbon blade flight was mounted on the top of a frusto-conical feed guide about 75 mm in height and having a base diameter of 100 mm. With this configuration, the upper part of the frusto-conical feed guide is located within the rotating barrel adjacent the inlet ports in the barrel whereby the lower end of the helical flight is just above the inlet port and the top of the guide. In this manner, the nuts feed upwardly into the region of the helical flight without the risk of being crushed by being wedged against the circumferential edge of the flight as the sweep rotates thereabout.

Unlike finer particulate materials, no boundary layer of nuts is formed on the inner wall of the rotating barrel, however the delivery rate appeared to be directly proportional to the rotational speed of the barrel. Similarly, it was noted over the speed range employed that there was a negligible change in power consumption suggesting that the nuts simply rolled up the helical pathway under the influence of friction with the inner wall of the barrel.

For shelled macadamia nuts, the smaller 76 mm diameter auger of EXAMPLE 3 was employed and no damage to the nut kernels was noted even after cycling the kernels through the elevating conveyor for extended periods.

Cracked macadamia shells, which are commonly used as a furnace fuel in a co-generation plant, also were handled with ease notwithstanding the highly irregular shaped particles having a particle size in the range of from about 3 mm to 10 mm. For this test, the 76 mm diameter helical elevating member of EXAMPLE 3 was again used, and it was noted that a boundary layer of shell particles formed against the inner wall of the barrel as it rotated.

The above specific examples demonstrate the versatility of the elevating conveyor according to the invention. To date, successful trials have been conducted on fine and coarse sand (both wet and dry), a wide range of cereal grains, soybeans, navy beans, steel shot (1.8 mm), flour, breadcrumbs, macadamia nuts (shelled and unshelled as well as cracked shells), coffee beans, freeze-dried coffee granules, molasses, ammonium nitrate prills (3-4 mm diameter), bauxite granules (6-8 mm diameter), blanched peanut kernels and powdered hydrated lime.

A significant advantage of the present invention is the lack of damage shown when highly frangible particulate materials such as freeze-dried coffee granules, soybeans and whole nut kernels are elevated in a conveyor according to the invention. Moreover, for very fine particulate materials such as hydrated lime, flour and the like, the apparatus according to the invention is characterized by an almost complete absence of airborne dust in the discharge chute during operation.

It readily will be apparent to a person skilled in the art that many modifications and variations may be made to the various aspects of the invention without departing from the spirit and scope thereof.

For example, for certain applications, depending upon the abrasiveness of the flowable material being handled, the tubular barrel and/or the helical elevating member may be fabricated from plastics material, or if made from metal, these metal components may be coated with wear resistant and/or corrosion resistant coatings such as TEFLON (Trade Mark) or the like. Similarly, the pitch of the helix may be variable along its length, either increasing or decreasing from bottom to top depending upon the nature of the material being conveyed.

The invention claimed is:

1. An elongate elevating conveyor for flowable materials, said conveyor comprising:
   an inlet and an outlet;
   a helical elevating member supported, in use, with a longitudinal axis in a substantially upright position, said elevating member being secured at at least one end to a support structure, said elevating member being secured against rotation about said longitudinal axis;
   a tubular barrel surrounding said elevating member and rotatable coaxially therewith said tubular barrel being rotatably journalled in bearing members spaced intermediate opposite ends of said barrel, said bearing members being secured to said support structure; and,
   a drive mechanism to rotatably drive said tubular barrel, said conveyor characterized in that a predefined working clearance between a cylindrical volume occupied by said helical elevating member and an inner surface of said tubular barrel is such that, in use, a stable layer of flowable material is formed against said inner surface of said tubular barrel, said stable layer urging a mass of flowable material within said barrel along an upward helical path by frictional engagement between said stable layer and said mass of flowable material.

2. A conveyor as claimed in claim 1 wherein said inlet is located adjacent a lower end of said tubular barrel.

3. A conveyor as claimed in claim 2 wherein a feed hopper surrounds an inlet located adjacent a lower end of said tubular barrel.

4. A conveyor as claimed in claim 1 wherein a conveyor feed mechanism is associated with said inlet to feed flowable material to said elevating conveyor at a predetermined rate.

5. A conveyor as claimed in claim 4 wherein the conveyor feed mechanism comprises at least one sweep member mounted on said tubular barrel for rotation therewith, said sweep member projecting outwardly from an outer wall surface of said tubular barrel.

6. A conveyor as claimed in claim 5 wherein one or more apertures are formed in said tubular barrel adjacent a respective at least one sweep member.

7. A conveyor as claimed in claim 5 wherein said at least one sweep member is adjustable to selectively increase or decrease a swept volume as said tubular barrel rotates.

8. A conveyor as claimed in claim 7 wherein said at least one sweep member as adjustable in length.

9. A conveyor as claimed in claim 7 wherein said at least one sweep member is adjustable in width.

10. A conveyor as claimed in claim 7 wherein said at least one sweep member is angularly adjustable relative to said outer wall surface of said tubular barrel.

11. A conveyor as claimed in claim 5 wherein at least portion of said at least one sweep member is resiliently flexible.

12. A conveyor as claimed in claim 1 wherein said inlet is located adjacent a top end of a hollow tubular support shaft for said elevating member.

13. A conveyor as claimed in claim 1 wherein said support structure comprises a frame.

14. A conveyor as claimed in claim 1 wherein said elevating member is secured at opposite ends of said frame member.

15. A conveyor as claimed in claim 14 wherein said elevating member is adjustably mounted in said frame to permit, in use, tension to be applied to said elevating member In the direction of the longitudinal axis of said elevating member.

16. A conveyor as claimed in claim 1 wherein the helical elevating member comprises a helically wound rod-like member with a central hollow cylindrical space extending over a longitudinal axis of said helically wound member.

17. A conveyor as claimed in claim 1 wherein the helical elevating member comprises a helically wound ribbon blade.

18. A conveyor as claimed in claim 1 wherein the helical elevating member comprises a central shaft.

19. A conveyor as claimed in claim 18 wherein the central shaft comprises a hollow shaft.

20. A conveyor as claimed in claim 19 wherein said hollow shaft is adapted, in use, to permit circulation of a working fluid therethrough to permit said elevating conveyor to function as a heat exchanger for fluid materials being conveyed therein.

21. A conveyor as claimed in claim 1 wherein a working clearance between a cylindrical volume occupied by said helically elevating member and an inner surface of said tubular barrel is less than a mean particle diameter of non-packable material.

22. A conveyor as claimed in claim 1 wherein the drive mechanism comprises a drive motor mounted on said support structure, said drive motor being drivably engageable with a drive transmission mechanism coupled to said tubular barrel.

23. A conveyor as claimed in claim 1 wherein a collector is positioned about said outlet to collect flowable material issuing from said outlet.

24. A method for elevation of a flowable material, said method comprising the steps of:
feeding a flowable material to an Inlet of an elevating conveyor comprising a stationary helical elevating member surrounded by a rotatable tubular barrel with a predefined working clearance between said helical elevating member and an inner surface of said barrel; and,
rotating said barrel at a speed sufficient to urge said flowable material towards said inner wall of said barrel to form a stable layer of flowable material thereon, whereby a mass of flowable material within said tubular barrel is urged upwardly along a helical path by frictional engagement between said mass of flowable material and said stable layer.

25. A method as claimed in claim 24 wherein said tubular barrel is rotated at a speed sufficient to farm a static layer of flowable material in a clearance space between a cylindrical volume occupied by said helical elevating member and an inner surface of said tubular barrel.

26. A method as claimed in claim 24 wherein fluid material is elevated in said conveyor as a hollow cylindrical mass.

27. A method as claimed in claim 24 wherein flowable material is fed to said inlet at a rate to substantially occupy a free volume within a cylindrical volume occupied by said elevating member during rotation of said tubular barrel.

28. A method as claimed in claim 24 wherein flowable material is fed to said inlet at a rate to occupy less than a free volume within a cylindrical volume occupied by said elevating member during rotation of said tubular member.

29. A method as claimed in claim 24 wherein a feed rate of said flowable material to said inlet is selectivefy varied by changing the configuration of a sweep member mounted on said tubular barrel.

30. A method as claimed in claim 29 wherein the configuration of said sweep member is changed by altering the dimensions of said sweep member.

31. A method as claimed in claim 29 wherein the configuration of said sweep member is changed by altering an angular disposition of said sweep member relative to an outer surface of said tubular barrel.

32. A method as claimed in claim 29 wherein the feed rate of said flowable material to said inlet is selectively variable by altering a rotational speed of said tubular barrel.

33. A method as claimed in claim 24 wherein the flowable material as introduced into an inlet at an upper end of a hollow central shaft of said elevating member to flow countercurrent to a mass of flowable material being elevated within said conveyor.

34. A method as claimed in claim 24 wherein a flowable material containing a liquid and particulate solids mixture is separated by subjecting the mixture to a centripetal force as the tubular barrel rotates and collecting liquid from a region adjacent a longitudinal axis of said elevating member and collecting condensed solids from a region adjacent an outer edge of the helical elevating member.

* * * * *

UNITED STATES PATENT AND TRADEMARK OFFICE
CERTIFICATE OF CORRECTION

PATENT NO. : 7,314,131 B2 Page 1 of 1
APPLICATION NO. : 10/547292
DATED : January 1, 2008
INVENTOR(S) : Olds It is certified that error appears in the above-identified patent and that said Letters Patent is hereby corrected as shown below:

Column 12, line 34 delete "in claim 1" and replace with --in any preceding claim--.

Column 12, lines 37-38 delete "frame member" and replace with --support structure--.

Column 12, line 40 delete "frame" and replace with --support structure--.

Signed and Sealed this

Twenty-ninth Day of April, 2008

JON W. DUDAS
*Director of the United States Patent and Trademark Office*